United States Patent [19]

Auchter

[11] Patent Number: 5,175,874
[45] Date of Patent: Dec. 29, 1992

[54] RADIOTELEPHONE MESSAGE PROCESSING FOR LOW POWER OPERATION

[75] Inventor: Thomas J. Auchter, Barrington, Ill.

[73] Assignee: Motorola, Inc., Schaumburg, Ill.

[21] Appl. No.: 682,996

[22] Filed: Apr. 10, 1991

[51] Int. Cl.⁵ .......................... H04B 1/40; H04B 1/16
[52] U.S. Cl. ...................................... 455/89; 455/343; 340/825.44
[58] Field of Search ...................... 455/38.1, 38.2, 38.3, 455/89, 32, 343; 340/825.44, 825.47, 825.48, 311.1; 379/61, 63; 370/94.1, 100.1

[56] References Cited

U.S. PATENT DOCUMENTS

| | | | |
|---|---|---|---|
| 4,398,192 | 8/1983 | Moore et al. | 340/825.44 |
| 5,058,203 | 10/1991 | Inagami | 455/343 |
| 5,140,698 | 8/1992 | Toko | 455/343 |

*Primary Examiner*—Reinhard J. Eisenzopf
*Assistant Examiner*—Lisa Charouel
*Attorney, Agent, or Firm*—Kenneth W. Bolvin

[57] ABSTRACT

The process of the present invention first synchronizes to incoming messages from the base station. The first data word is received and stored in the radiotelephone. The error code in the data word is next checked to determine if errors exist in the word. If there are errors, the word is corrected. This process is repeated on another data word and the second received word is compared with the first. If the words are not equal, the receiver remains on until at least two words are equal or the entire length of the message is received. If the words are equal, the word is processed by the radiotelephone and the receiver is turned off for the remaining portion of the message until the next synchronization word is to be received.

9 Claims, 2 Drawing Sheets

DOTTING = 1010101010
WORD SYNC = 11100010010

RADIOTELEPHONE MESSAGE PROCESSING FOR LOW POWER OPERATION

FIELD OF THE INVENTION

The present invention relates generally to the field of communications and particularly to radiotelephone communications.

BACKGROUND OF THE INVENTION

Radiotelephones, while in an idle or standby mode, must constantly monitor a continuous stream of data messages that are sent by the base station. One of these data message streams is on the forward control channel. The format of these messages is shown in FIG. 1 and is explained in more detail in Electronic Industries Association (EIA) 553 cellular system specification at section 3.7.

The radiotelephone uses the dotting word (101), the first word of the message, to synchronize the radiotelephone hardware to the clock of the data message. The synchronization word (102) indicates the present location in the data stream to the radiotelephone and that the data sequence is about to start. Repeat words A and B (103 and 104) are each forty bit words, the content and format of which are defined in EIA 553, and each is repeated five times in the message as illustrated. The radiotelephone receives both of these words but only processes one of them. Which one the radiotelephone processes is determined by the least significant digit of the radiotelephone's telephone number. If the telephone number is even, word A is processed; otherwise word B is processed. In order to receive and process these words, the radiotelephone's receiver must be on and drawing power the entire time, thereby reducing the time a portable, battery-powered radiotelephone can be used for communication. There is a resulting need for a way to reduce the time that the radiotelephone's receiver remains on during the idle mode, thus reducing power consumption, while still receiving the necessary information from the base station.

SUMMARY OF THE INVENTION

The process of the present invention initially synchronizes the radiotelephone to incoming messages from the base stations forward control channel. The first repeat data word, either A or B, is received and stored in the radiotelephone. The error code in the data word is next checked to determine if errors exist in the word. If there are errors, the word is corrected. This process is repeated on another data word and the second received word is compared with the first. If the words are not equal, the words have been corrupted by noise or other interference and, therefore, the receiver remains on for the remainder of the message. If the words are equal, the word is processed by the radiotelephone and the receiver is turned off for the remaining portion of the message until the next synchronization word is to be received.

DETAILED DESCRIPTION OF THE PREFERRED EMBODIMENT

The process of the present invention reduces the time the radiotelephone's receiver is on, and therefore drawing power, while in the idle state. This is accomplished by shutting off the receiver, for the remainder of the message, after the receipt of an error free repeat word has been verified.

Figure 1:
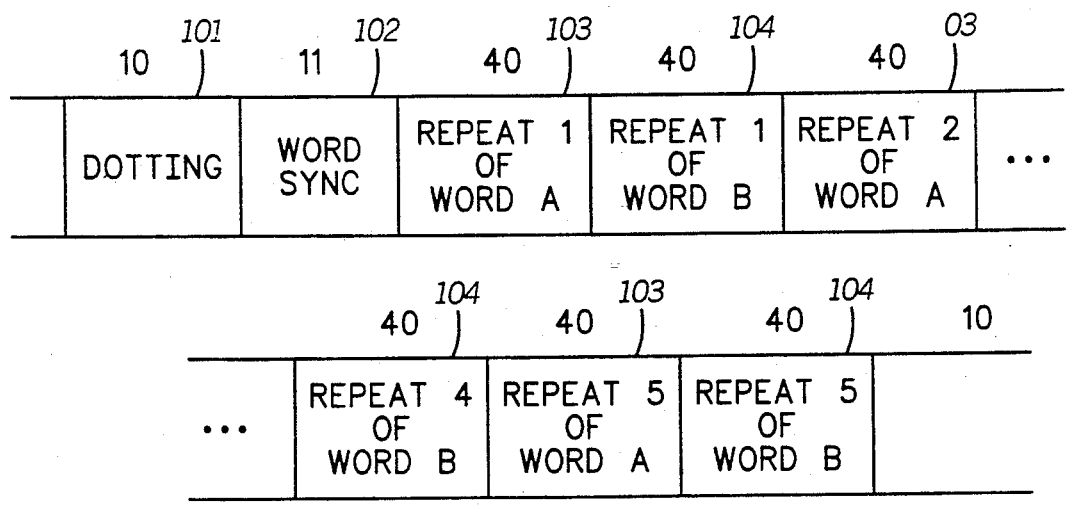
FIG. 1 illustrates the message format of the data stream received from the base station.
Figure 3:
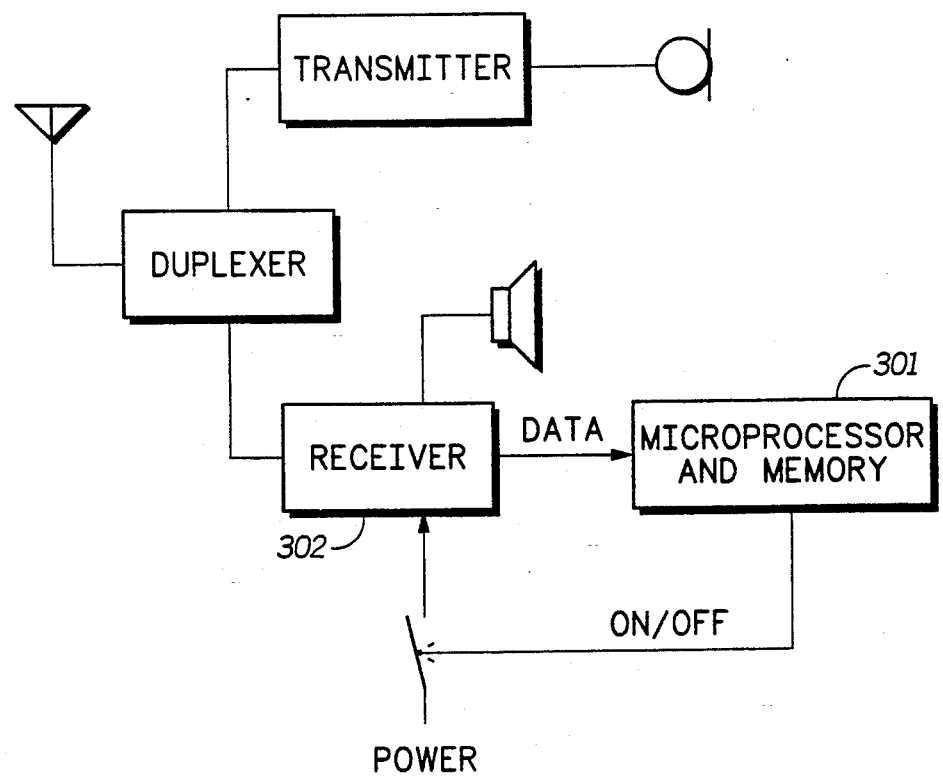
FIG. 3 illustrates a block diagram of a portion of a radiotelephone in accordance with the present invention.
Figure 2A:
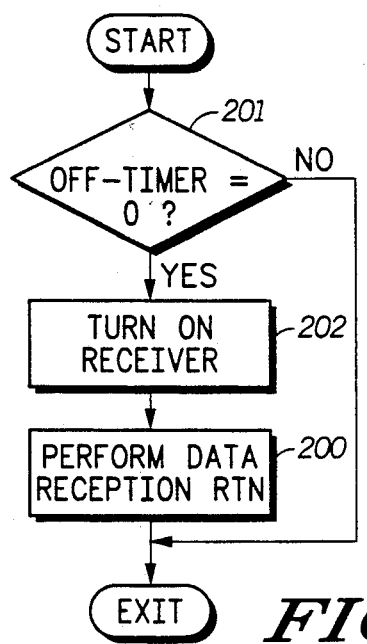
FIGS. 2A and 2B illustrate flowcharts of the process of the present invention.
Figure 2B:
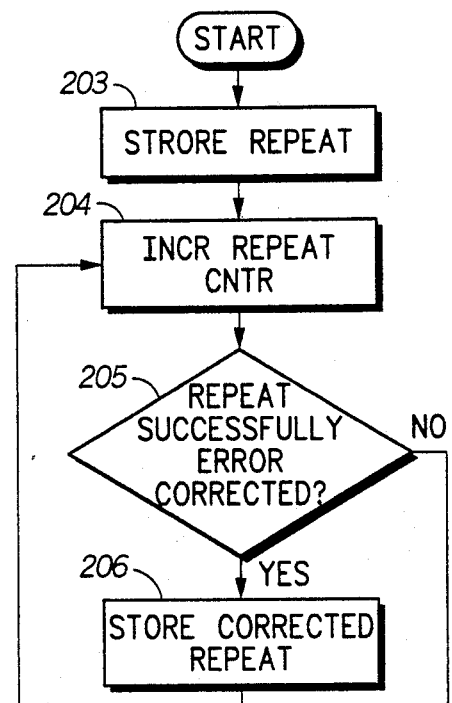
Figure 2B:
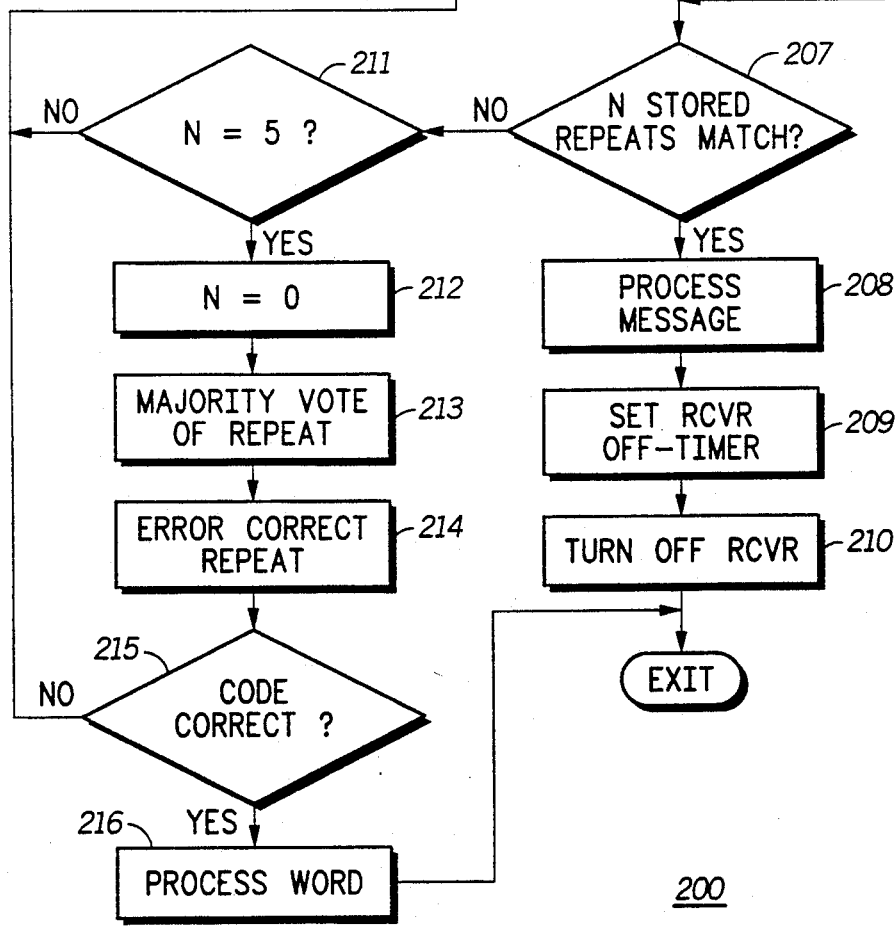

The process of the present invention is illustrated in FIGS. 2A and 2B. Initially, an off-timer is checked for a zero condition (201). This timer determines the length of time the receiver is to be turned off. If the off-timer is not zero, the receiver should remain off and the routine is exited. Once the off-timer reaches zero, the receiver is turned on (202) and the data reception routine (200) is performed to receive the data messages from the base station. The radiotelephone, a block diagram of the relevant portions of which is illustrated in FIG. 3, then receives the data messages sent by the base station. Once the message reaches the dotting word (101), the radiotelephone starts the synchronizing process. The dotting word (101) enables the radiotelephone hardware to synchronize with the data message clock. The radiotelephone next receives the synchronization word (102) that indicates to the radiotelephone the start of the repeat word (103 and 104) sequence.

The first received and processed repeat word, either A (103) or B (104), depending on the radiotelephone's telephone number, is stored in the radiotelephone (203). Since the radiotelephone only processes either an A or B repeat word, subsequent reference to repeat words (103 or 104), unless indicated otherwise, is to the specific repeat word processed by the radiotelephone.

A repeat word counter is next incremented (204) to keep track of the number of repeat words received. The error code in the word, explained in more detail in EIA 553, is checked to determine if errors are present in the word (205). If there are errors, caused by noise or other interference while in the transmission process, an attempt is made to remove the errors. This error correction process is described in detail in the EIA 553 specification. If the errors are repaired (205), the corrected repeat word is stored (206) for later comparison. If the errors could not be corrected, the process checks the word counter to determine if all five repeat words have been received (211). If all of the repeat words have not be received, the process repeats from the beginning in order to retrieve at least five. When the word counter reaches five, it is reset to zero (212) to get ready for the start of a new message. A majority vote of the received repeat words is next performed (213).

The majority vote (213) compares the five received repeat words. If there are at least three that are the same, this word is assumed to be the word to be processed by the radiotelephone. If the error code indicates a requirement that the repeat word be error corrected, an error correction attempt is made (214). If the correction is not successful, the radiotelephone ignores the word and returns to the beginning of the process to wait for another data message (215). If the error correction is successful, the word is processed (216) by the radiotelephone. The process performed depends on the information contained in the word, as illustrated in EIA 553.

After the error corrected repeat word is stored (206), it is compared with any other repeat words that have been stored (207). If no other repeat words have been stored, the process goes back to the beginning to wait for another word. If the predetermined number of stored words match, this number being two in the preferred embodiment, this word is assumed to be the correct repeat word and is processed by the radiotelephone (208). As before, the process performed depends on the information contained in the word.

Once the radiotelephone is finished processing (208), the off-timer is set (209) for the length of time remaining until the next synchronization word is expected. Since the radiotelephone is synchronized with the data message, the radiotelephone knows how long it will be until the next synchronization word is to be received. The receiver can then be turned off (210), reducing the power consumption of the radiotelephone, until the next synchronization word is due. The data reception routine (200) then returns to the power control routine and the timer is checked for a zero condition (201). Once the timer reaches zero, the receiver is turned on (202), and the data reception process (200) of the present invention begins again.

FIG. 3 shows a block diagram of a typical radiotelephone. The microprocessor (301), which runs the process of the present invention, receives the repeat words from the receiver (302) and, in response to the above described process of the present invention, controls the power to the receiver (302).

In summary, a process for operating a radiotelephone at reduced power has been shown. This process enables the radiotelephone to turn off the receiver for periods of time, thereby conserving the battery power.

I claim:

1. A method for operating a radiotelephone at reduced power, the radiotelephone having a receiver, memory, synchronizable hardware, and processor for processing one of a plurality of messages received from a base station, each message being comprised of a plurality of synchronization words, at least one data word, and at least one repeated data word, each data word including an error code, the method comprising the steps of:
   synchronizing the synchronizable hardware to a first synchronization word;
   synchronizing the radiotelephone to a first message of the plurality of messages in response to a second synchronization word;
   receiving the at least one data word;
   storing the at least one data word;
   modifying the at least one data word in response to the error code;
   if the repeated data word has not been received, repeating from step b, thereby forming a plurality of received data words;
   comparing at least two words of the plurality of received data words to each other;
   if the at least two words are not the same, receiving any remaining of the repeated data words in the first message; and
   if the at least two words are the same, shutting off the receiver for a predetermined time.

2. The method of claim 1 wherein the predetermined time is for the remainder of the repeated data words in the first message.

3. A method for operating a radiotelephone at reduced power, the radiotelephone having a receiver, memory, synchronizable hardware, and processor for processing a plurality of messages received from a base station, each message being comprised of a plurality of synchronization words, and a first and second data word, each data word including an error code and being repeated a plurality of times in the message, the radiotelephone processing only the first or the second data word, the method comprising the steps of:
   synchronizing the synchronizable hardware to a first synchronization word:
   synchronizing the radiotelephone to a first message of the plurality of messages in response to a second synchronization word;
   receiving the second data word;
   storing the second data word;
   modifying the second data word in response to the error code;
   if a repeated second data word has not been received, repeating from the step of receiving the second data word, thereby forming a plurality of received second data words;
   comparing the plurality of received second data words to each other;
   if at least two of the received second data words are not the same, receiving any remaining of the repeated second data words in the first message; and
   if the at least two received second data words are the same, shutting off the receiver for a predetermined time.

4. The method of claim 3 wherein the predetermined time is for the remainder of the repeated second data words in the first message.

5. A method for operating a radiotelephone at reduced power, the radiotelephone having a receiver, synchronizable hardware, and processor for processing a plurality of messages received from a base station, each message being comprised of a plurality of synchronization words, and a first and a second data word, each data word including an error code and being repeated a plurality of times in the message, the radiotelephone processing only the first or the second data word, the method comprising the steps of:
   synchronizing the synchronizable hardware to a first synchronization word;
   synchronizing the radiotelephone to a first message of the plurality of messages in response to a second synchronization word;
   receiving the first data word;
   storing the first data word;
   modifying the first data word in response to the error code;
   if a repeated first data word has not been received, repeating from the step of receiving the first data word, thereby forming a plurality of received first data words;
   comparing the plurality of received first data words to each other;
   if at least two of the received first data words are not the same, receiving any remaining of the repeated first words in the first message; and
   if the at least two received first data words are the same, shutting off the receiver for a predetermined time.

6. The method of claim 5 wherein the predetermined time is for the remainder of the repeated first data words in the first message.

7. A radiotelephone for communicating with a base station and having synchronizable hardware, the base station transmitting a plurality of messages, each message being comprised of a plurality of synchronization words, at least one data word, and at least one repeated data word, each data word including an error code, the radiotelephone comprising:

receiving means for receiving the plurality of messages;

transmission means for transmitting signals;

memory means for storing the at least one data word; and processing means for controlling the radiotelephone, the processing means performing a method of operating the radiotelephone at reduced power, the method comprising the steps of:

synchronizating the synchronizable hardware to a first synchronization word;

synchronizing the radiotelephone to a first message of the plurality of messages in response to a second synchronization word;

receiving a first data word;

storing the first data word;

modifying the first data word in response to the error code;

if the repeated first data word has not been received, repeating from the step of receiving a first data word;

comparing at least two of the first data words to each other;

if the at least two first data words are not the same, receiving any remaining of the repeated first data words in the first message; and if the at least two first data words are the same, shutting off the receiver for a predetermined time.

8. A method for operating a radiotelephone at reduced power, the radiotelephone having a receiver, synchronizable hardware, and processor for processing a plurality of messages received from a base station, each message being comprised of a plurality of synchronization words, at least two data words, and at least one repeated data word, each data word including an error code, the method comprising the steps of:

synchronizing the synchronizable hardware to a first synchronization word;

synchronizing the radiotelephone to a first message of the plurality of messages in response to a second synchronization word;

receiving at least two data words;

modifying each data word in response to the error code in each data word;

comparing the at least two data words to each other;

if the at least two data words are not the same, receiving any remaining of the repeated data words in the first message; and if the at least two data words are the same, turning off the receiver for a predetermined time.

9. A method for operating a radiotelephone at reduced power, the radiotelephone having a receiver, synchronizable hardware, and processor for processing a plurality of messages received from a base station, each message being comprised of a plurality of synchronization words, at least two data words, and at least one repeated data word, each data word including an error code, the method comprising the steps of:

synchronizing the synchronizable hardware to a first synchronization word;

synchronizing the radiotelephone to a first message of the plurality of messages in response to a second synchronization word;

receiving at least two data words;

modifying each data word in response to the error code in each data word;

comparing the at least two data words to each other;

if the at least two data words are not the same, receiving any remaining of the repeated data words in the first message; and if the at least two data words are the same, turning off the receiver until the first synchronization word in a second message of the plurality of messages is received.

* * * * *